United States Patent [19]

Baldwin

[11] Patent Number: 5,001,696
[45] Date of Patent: Mar. 19, 1991

[54] METHOD OF PREPARING AN IMAGE ACCESS CARD

[75] Inventor: Dwight G. Baldwin, Austin, Tex.

[73] Assignee: Minnesota Mining and Manufacturing Company, St. Paul, Minn.

[21] Appl. No.: 544,657

[22] Filed: Jun. 27, 1990

Related U.S. Application Data

[63] Continuation-in-part of Ser. No. 455,834, Dec. 15, 1989, and a continuation of Ser. No. 361,822, Jun. 1, 1989, abandoned, which is a continuation of Ser. No. 123,188, Nov. 20, 1987, abandoned.

[51] Int. Cl.$^5$ .............................................. G09B 7/06
[52] U.S. Cl. .................................... 364/521; 434/311; 434/308
[58] Field of Search ....................... 364/521, 518, 514; 340/723, 776, 790, 798, 799; 434/310, 311, 308, 314–318, 429, 430, 365; 235/449, 454, 462, 493

[56] References Cited

U.S. PATENT DOCUMENTS

| | | | |
|---|---|---|---|
| 3,980,401 | 9/1976 | Holliday | 352/27 |
| 4,324,484 | 4/1982 | Johnson | 355/5 |
| 4,337,375 | 6/1982 | Freeman . | |
| 4,425,099 | 1/1984 | Naden | 434/311 X |
| 4,673,357 | 6/1987 | Ito | 434/311 |
| 4,681,548 | 7/1987 | Lemelson | 434/311 |
| 4,729,564 | 3/1988 | Kung et al. | 434/311 X |
| 4,739,377 | 4/1988 | Allen | 355/6 |
| 4,751,394 | 6/1988 | Matsuoka et al. | 250/561 |
| 4,805,087 | 2/1989 | Frankel et al. | 235/462 |
| 4,818,852 | 4/1989 | Haddock et al. | 235/488 |
| 4,958,171 | 9/1990 | Fulton et al. | 346/153.1 |

OTHER PUBLICATIONS

A two-page flier entitled, "3M Microfilm Aperture Cards".

*Primary Examiner*—William M. Shoop, Jr.
*Assistant Examiner*—A. Jonathan Wysocki
*Attorney, Agent, or Firm*—Gary L. Griswold; Walter N. Kirn; Jack V. Musgrove

[57] ABSTRACT

A method and system for preparing image access cards to be used with an image access system. The image access system utilizes a storage medium containing the images and a reference table which includes a series of reference numbers associated with the storage address of each image. The method of making the image access documents utilizes the steps of placing the images on the storage medium, assigning a reference number to each image, and constructing the reference table. Several variations in the construction of the image access document are available. A printer may be used to print a human readable representation of the image and a machine readable form of the reference number directly onto a supportive substrate. Preprinted cards may be provided with the machine readable reference numbers thereon, and the human readable representation may be printed by a printer, hand drawn, or applied by way of a sticker. Tags, such as adhesive labels or transparent envelopes, may have the reference number printed thereon and be used in conjunction with the substrate having the human readable representation. A system for preparing the foregoing constructions advantageously employs a processor running the card preparation software, a storage device, a keyboard, a display, and the printer.

32 Claims, 4 Drawing Sheets

METHOD OF PREPARING AN IMAGE ACCESS CARD

CROSS-REFERENCES TO RELATED APPLICATIONS

This application is a continuation-in-part of co-pending U.S. Patent Application Ser. No. 455,834 filed Dec. 15, 1989. That application was itself a continuation of U.S. Patent Application Ser. No. 361,822 filed June 1, 1989 (now abandoned), which was a continuation of U.S. Patent Application Ser. No. 123,188 filed Nov. 20, 1987 (now abandoned).

BACKGROUND OF THE INVENTION

1. Field of the Invention

The present invention generally relates to projection and display systems, and more particularly to a system for preparing documents for accessing and retrieving images stored on a separate medium.

2. Description of the Prior Art

The storage and retrieval of visual data has become increasingly important, as such information becomes more useful and necessary in modern business and technology. There are several conventional devices for handling image information, ranging from simple constructions such as slideshow carousels, to advanced electronic storage and display systems. Each of these devices, however, suffer from certain disadvantages due to the inherent limitations of either the storage medium, the access means, or the form of display.

For example, some media, like microfilm, require elaborate, bulky equipment to retrieve the data, although accessing the information is a simple matter once the microfilm is loaded onto the reader. Conversely, a slideshow carousel is extremely light and portable, but most of these devices limit access to sequential (forward or reverse) viewing in a predetermined order. Slideshow projectors also allow viewing by a larger audience, while microfilm readers are totally unsuited for this purpose. Computer graphic systems contain the same limitation, i.e, they provide only a single display on the user's CRT.

One apparatus having certain advantages of each of the foregoing systems is an overhead projector (OHP), used with transparencies. Transparencies allow for the random access of images as do microfilm and computer storage systems. Yet modern overhead projectors are much more compact than microfilm readers or computers having CRT displays. Actually, overhead projectors have recently been combined with computer graphics systems by the use of liquid crystal display (LCD) technology. A transmissive LCD panel, connected to and driven by a computer, may be placed on the stage area of an overhead projector, thereby projecting the same image on a screen that is also appearing on the computer's CRT.

The primary disadvantage of overhead projectors (with or without LCD panels) lies in the manipulation or control of the presentation of images. In a transparency/OHP system, for instance, fumbling, misalignment and mutilation of transparencies inevitably occurs during the presentation itself. An equally undesirable drawback in the alternative LCD/OHP system, is that access and retrieval of images is typically limited to sequential presentation, much like a slide projector. Although there are LCD/OHP systems which allow random access to stored images, these systems require additional interaction by the user, namely, typing in keyboard commands and file names.

It would, therefore, be desirable and advantageous to devise a system which is not so limited by the type of storage medium or display, but nevertheless has the advantages of each of the foregoing devices, particularly simplified, but sophisticated, control in the presentation of images. Such a system is described in co-pending U.S. Patent Application Ser. No. 455,834 filed Dec. 15, 1989. That system utilizes a novel image access document for controlling a computerized retrieval and display architecture. The present invention is directed to methods of, and structures for, preparing such image access documents.

As further background, it is understood that several conventional image retrieval methods employ documents which contain the image and related information. For example, microfilm information storage arrangements, such as that shown in U.S. Pat. No. 3,980,401 issued to R. Holliday, have recorded indicia for randomly retrieving information from microfilm members when the indicia are aligned with reference means on the microfilm reader. Another conventional technique for retrieving photographic images (negatives) involves the use of aperture cards, such as FILMSORT brand aperture cards sold by Minnesota Mining & Manufacturing Co. (3M), assignee of the present invention ("FILMSORT" is a trademark of 3M). Finally, several devices which provide interactive education/entertainment employ cards having visual images and related information, such as audio information or answers to questions printed on the cards. Three such devices are shown in U.S. Pat. Nos. 4,337,375 issued to A. Freeman; 4,425,099 issued to R. Naden; and 4,673,357 issued to T. Ito. None of the foregoing systems, however, utilize a card having a visual image printed thereon which corresponds to the same image stored on a separate medium.

SUMMARY OF THE INVENTION

The present invention comprises methods of, and systems for, preparing documents for an image access system in which a plurality of images are stored on a separate storage medium. The basic method comprises the steps, in any order, of placing a human readable representation of the image on a supportive substrate, applying a reference number to the substrate, and constructing a reference/index table which correlates the reference number to the address of the image on the storage medium. The substrate may exclusively comprise a card having the image and reference number printed directly thereon or, alternatively, various sorts of "tags" may be used in conjunction with the card, such as adhesive labels or transparent envelopes.

The apparatus for preparing the cards includes a processor which runs the card preparation software (and optionally graphics software), a manual interface with the processor (e.g., a keyboard and/or mouse), the storage device (e.g., a standard magnetic disk and disk drive), a display, and a printer. The printer may optionally be provided with a card reader to obtain the reference number directly from preprinted, indexed cards. Of course, the image access documents themselves may be prepared manually without the use of a computerized preparation system, for example, by affixing pictures to pre-indexed cards and hand writing notes thereon.

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
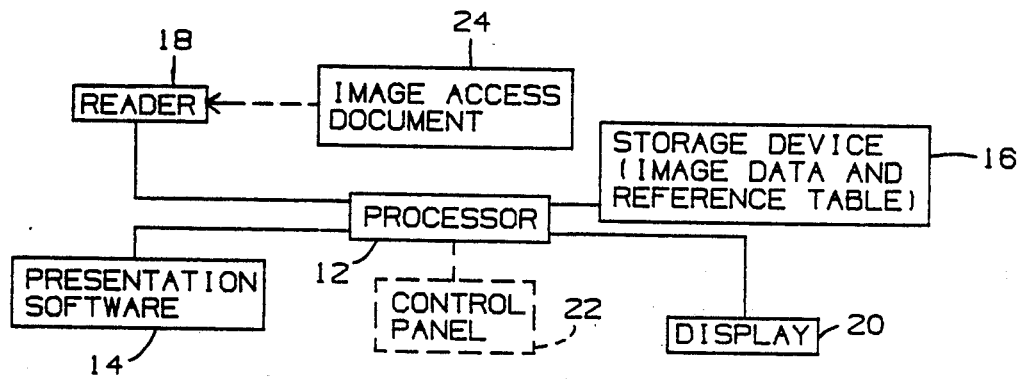
FIG. 1 is a block diagram of the image access system as more fully discussed in U.S. Patent Application Ser. No. 455,834.

With reference now to the figures, and in particular with reference to FIG. 1, there is depicted the image access system 10' described in greater detail in U.S. Patent Application Ser. No. 455,834 filed Dec. 15, 1989, which is incorporated by reference. Image access system 10 is generally comprised of a processor 12, which carries out instructions from the presentation software 14, a storage device 16, a card reader 18, a display 20, a control panel 22, and an image access document 24. The dashed lines around control panel 22 indicate that it is not part of the basic image access system, but is optional as explained further below.

Processor 12 is any type of conventional microprocessor, and usually has associated components such as read-only memory (ROM) and random-access memory (RAM). processor 12 may be part of a larger computer system which is capable of supporting the other elements of image access system 10. A custom processor might include programmable read-only memory (PROM) for storing the program instructions of presentation software 14.

Storage device 16 is typically a disk drive which receives a magnetic storage diskette, although other storage devices may be used, e.g., a "hard" disk (permanently affixed to processor 12), a group of randomaccess memory (RAM) circuits, an array of programmable read-only memory (PROM) circuits, or an optical reader which receives a compact diskette (CD). Storage device 16 could further comprise a plurality of slides in a carousel (preferably providing random accessibility), a still video disk, or even a video cassette recorder (VCR) having continuous video sequences. Practically any type of image storage system can be manipulated by the use of image access system 10.

Reader 18 is any kind of sensing device which can detect a reference number or other identifier placed on the image access document. Devices include standard optical readers (e.g., character or bar code recognition), magnetic heads, electronic sensors, and tactile pick-ups. Display 20 may be practically any form of display. If slides were the storage medium, they would also form part of display 20 along with the carousel module. Images stored on electronic or magnetic media (including, but not limited to, digital floppy disks, analog still video disks, VCR tapes, CD's (optical disk), and memory circuits) could be directed to one or more CRT's, an LCD/OHP arrangement, or a projection television, each acting as displays.

As mentioned above, control panel 22 is optional, and its attributes depend upon the specific features of presentation software 14 being used. For example, an image sequence, such as portions of the displayed image being selectively revealed or concealed, require an actuation signal or mechanism, such as a switch, key, or button. Continuous animation would advantageously employ pause, forward and reverse keys. Further details of the presentation software may be found in the parent case, Ser. No. 455,834. It is, therefore, difficult to designate a single control panel configuration as being optimal. Alternative control means include a standard keyboard, an electronic mouse, voice recognition commands, etc. In fact, a standard keyboard may be provided in addition to control panel 22, for instance, where image access system 10 is running on a personal computer and the user desires to interface other software applications residing on the same computer.

Figure 2:
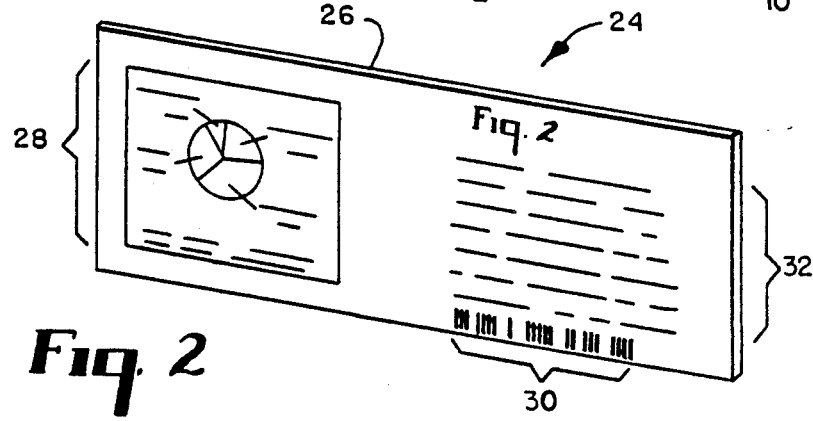
FIG. 2 is a perspective view of the image access document created by the present invention.

The novelty of the foregoing system is embodied in image access document 24; the parent application, however, did not fully describe the steps involved in the preparation of such a document. There are, indeed, several methods for preparing alternative constructions of image access document 24. FIG. 2 illustrates the essential elements of image access document 24, namely, a supportive substrate 26 having an image field 28 and a reference field 30. A third field 32 may be provided for text or handwritten notations, but this is optional. Substrate 26 is preferably constructed of a durable material, such as plastic or thick paper.

Image field 28 contains an image in human readable form. The image may be printed directly on substrate 26, affixed by means of a label, or comprise a slide-like transparency which fits in a window in substrate 26. It is understood that the term "image" as used herein means, without limitation, graphics designs, photographs, drawings, sketches, text, or computer generated figures. "Image" also includes discrete or continuous animation sequences, although the human readable form of such images must necessarily be a limited representation such as a beginning or end still shot.

Reference field 30 is provided with a machine readable reference number, and may optionally include a human readable version of the reference number (optically scannable type face is both machine readable and human readable). The machine readable reference number may be applied by one of several means, depending upon the type of reader 18 is used in image access system 10. It may be electronically encoded (capacitative or logic circuitry), optically encoded (bar code or scannable type face), magnetically encoded (in which case a magnetic recording medium must be provided on substrate 26), or mechanically encoded (with bumps, depressions, holes, etc.). The preferred embodiment utilizes retroreflective bar coding. The reference number is used, as explained further below, to determine the storage address of the image in storage device 16.

Figure 3:
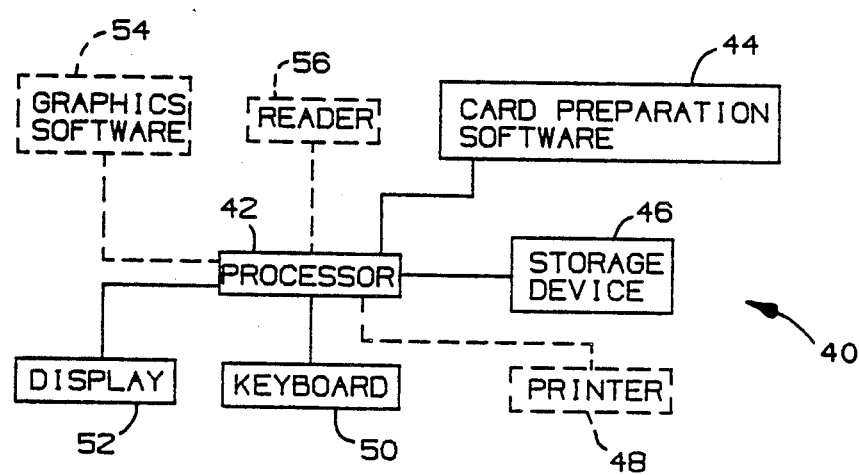
FIG. 3 is a block diagram of the card preparation system of the present invention.

Referring now to FIG. 3, the card preparation system 40 of the present invention is explained. Card preparation system 40 comprises another processor 42 (including associated RAM, PROM, etc.) which carries out program instructions from the card preparation software 44, another storage device 46 (essentially identical to storage device 16 of image access system 10), a printer 48, a keyboard 50 (or equivalent control means), and a display 52. In some instances, these components may be the exact same component used in image access system 10. For example, image access system 10 and card preparation system 40 may both operate on a personal computer having a conventional disk drive and display, in which case processors 12 and 42 would be the same, displays 20 and 52 would be the same, and storage devices 16 and 46 would be the same, as might be control panel 22 and keyboard 50.

Display 52 may be used to view the stored images, but its primary purpose is to allow interaction with processor 42, i.e., provide computer prompts and queries. If the images are computer generated, then graphics software 54 may be provided, but this is considered optional to the basic design of card preparation system 40. Printer 48 is also deemed optional since it is unnecessary in the manual preparation scheme described in conjunction with FIG. 5C; printer 48 is, however, necessary to the other embodiments. Printer 48 may take the form of other mechanical printing devices, e.g., a plotter. A reader 56 may also be provided, as explained further below.

Figure 4A:
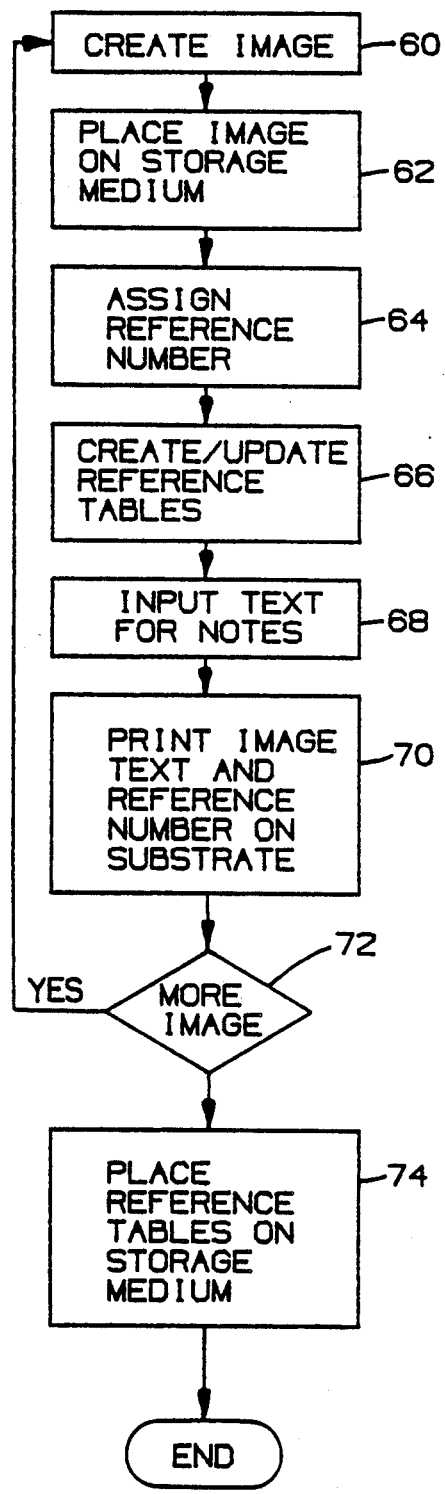
FIGS. 4A–4C are flow charts depicting alternative procedures for creating the image access documents.
Figure 4B:
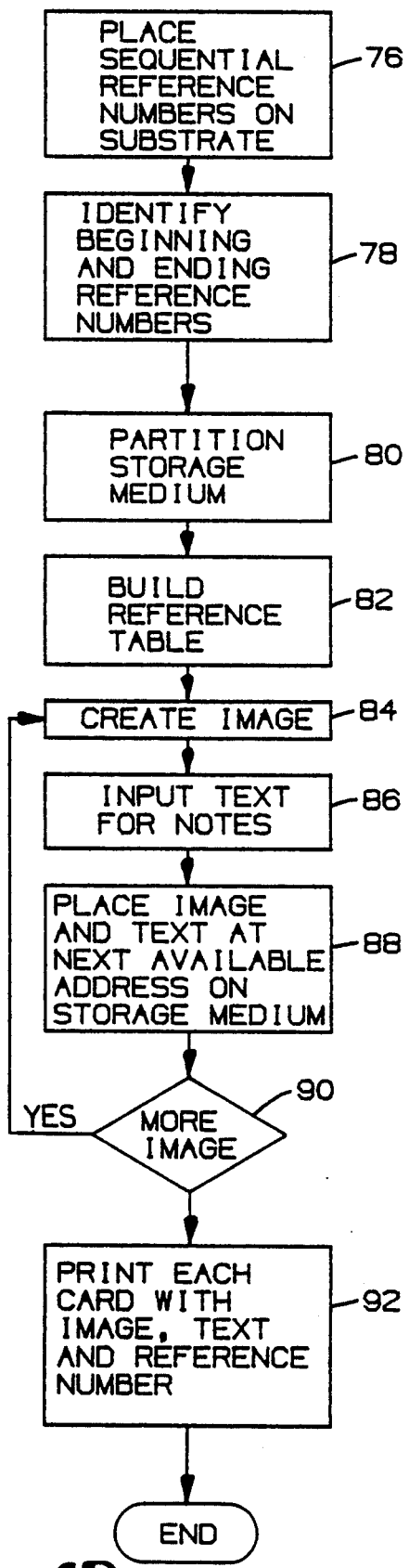
Figure 4C:
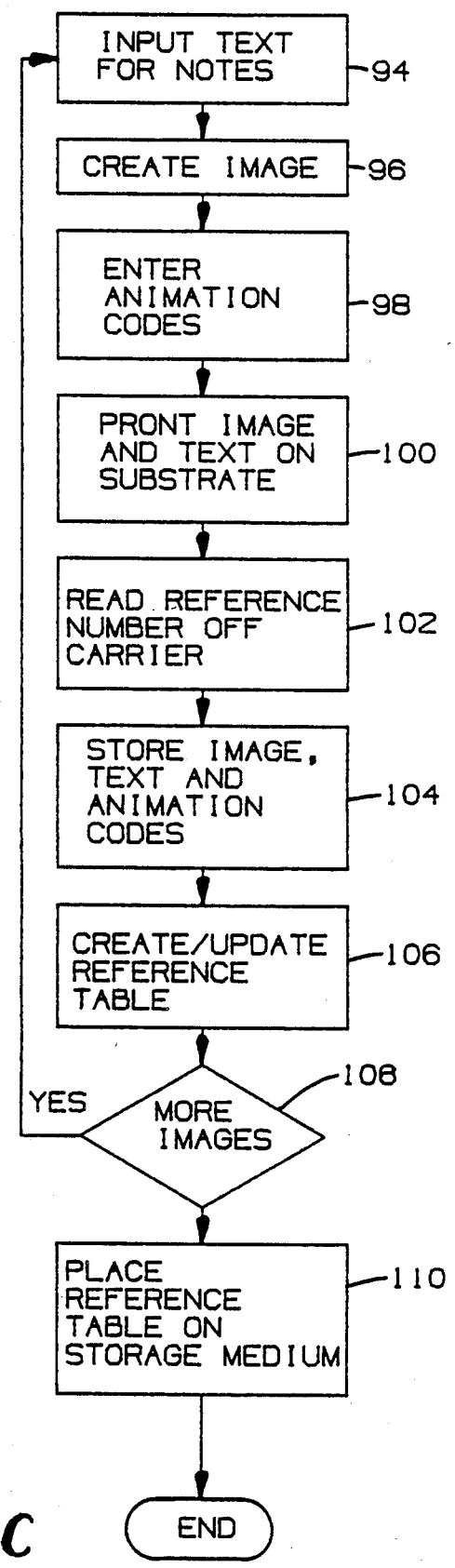

The nature of card preparation software 44 and the function of the various elements of card preparation system 40 may best be understood with reference to FIGS. 4A-4C, to which attention is now directed. These drawings depict the flow of three different versions of card preparation software 44. The steps illustrated in these flow charts are merely exemplary, and it is not critical that they be performed in the exact order stated.

FIG. 4A illustrates the most straightforward approach. First, an image is created (60), e.g., by using graphics software 54, and placed on the storage medium (62). A reference number is then assigned to that particular image (64). The reference number may be selected by several alternative means. One algorithm uses the current year, month, day, hour, minute, second and 1/100th of second to generate the reference number. This minimizes the possibility that two different created images will have the same reference number. Other algorithms may utilize a sequence based on (i) a user number, (ii) the identification number of the storage device (diskette), or (iii) a serial number of the processor 42. The reference number may even be the actual machine address of the location at which the image is stored on storage device 46. It is undesirable, however, to use a simple numeric sequence for the reference numbers since this increases the chances of retrieving the wrong image when a user has made multiple use of card preparation system 40. While the term reference "number" has been used, it is understood that this identifier may comprise non-numeric characters, i.e., alphanumeric and special (e.g., ASCII) characters.

Once a reference number has been selected for the image, a reference table is created (or updated if already existing) (66). The reference table is essentially an index or directory which correlates each image access document 24 to an image having a known address on storage device 46. After updating the reference table, the user is prompted (68) to enter any textual material for note field 32. Processor 42 then prints the image, textual material, and reference number onto a substrate material (70). If there are more images, this series of steps is repeated for each image (72). After all images have entered, the final reference table is placed on the storage medium (74).

The printing step (70) may further have several variations. First of all, it may result in the image, text and reference number all being printed on one side of image access document 24, as shown in FIG. 2. Alternatively, the image and text may be on one side, but the reference number may be printed on the other; this would require a customized printer 48. A compromise between these two designs would print all information on one side of substrate 26, but it would be folded to result in the reference number being visible only from the rear of the folded card. Printer 48 could also be equipped with additional output means if the reference number were not optically detectable; additional features might include a magnetic head, which could embed the reference number on a magnetic strip, or a punch rod which would make holes in the substrate material. Additionally, a "tag" might be used, such as a protective envelope 124, which provides the machine readable form of the reference number (see FIG. 5B); in this case the reference number might be printed on substrate 26 in human readable form only, whereby it can be manually inserted into envelope 124. Finally, special printer paper may be provided (with predetermined perforations, creases, etc.), to facilitate construction of image access documents created with standard computer printers.

FIG. 4B illustrates an alternative version of card preparation software 44 in which the reference table is constructed prior to the creation or storage of any images. It is first necessary, however, to place a series of reference numbers on the substrates (76) which will later receive the human readable image and textual notes. This may be accomplished by obtaining a stack of preindexed cards already having machine readable, and human readable, reference numbers printed thereon. Alternatively, various types of tags may be used to affix the reference number, such as the previously mentioned envelope 124 of FIG. 5B, or an adhesive label 122 as shown in FIG. 5A.

After entering the predetermined reference numbers (e.g., by identifying (78) the beginning and ending numbers in the sequence), the storage medium is partitioned to provide sufficient space for the number of images to be stored (80). The addresses of the storage locations are thus known prior to actual storage of the images, and the reference table may be immediately constructed (82). Then, as an image is created (84), and the textual material is entered (86), the image and text may be stored at a predetermined address corresponding to a previously assigned reference number (88). This is repeated for each image (90).

After all of the images have been entered, each card is printed. The output of printer 48 here depends upon the manner in which the reference numbers were initially provided in step 76. If preprinted cards are used, then the printer will output only the image and textual notations (preprinted cards should be loaded into the printer in sequential order). If envelopes 124 are used, then a human readable form of the reference number will also be printed on the substrate so that it can be matched with the corresponding envelope.

FIG. 4C illustrates yet another variation of card preparation software 44 in which predetermined reference numbers are automatically correlated to the images as they are created. This version again requires a supply of preindexed cards or envelopes having machine readable reference numbers thereon, although they need not have human readable reference numbers. This setup would further require the use of the optional reader 56. Firstly, textual material for the image is entered (94), and the image itself is created or captured (96). If the image is an animation sequence (whether discrete or continuous), animation codes may also be recorded (98). For example, portions of an image may be selectively revealed or concealed, in which case it is necessary to identify those portions, or to identify the order of related images in the image sequence. This may be accomplished, among other ways, by "linking" a series of images together. The animation codes therefore include such card linking codes, as well as display format codes, e.g., for displaying or erasing images with vertical and horizontal scrolling, wipe overs, zip ons, explodes, quick flash, blinding, windowshading, etc.

The image and text are then printed on the substrate (100). Reader 56 is coupled to printer 48 whereby the reference number preprinted on substrate 26 may be read nearly simultaneously with the printing step (102). As previously noted, the preprinted reference number may also be on a label or envelope. Therefore, it is more instructive to say that the reference number may be preprinted on a carrier, the carrier being either the substrate itself or a tag. Of course, reader 56 need not be limited to optical sensing, as the reference number may be placed on the supplied carrier in magnetic, electronic or mechanical form. After reading the reference number from the carrier, the image and text just printed thereon are placed on the storage medium (104), along with any animation codes. The reference table is updated (106) with the reference number sensed by reader 56. Animation codes may also be embedded in the reference table. These steps are repeated for each image (108). After all the images have been created, printed and stored, the final reference table is placed on the storage medium (110).

Figure 5B:
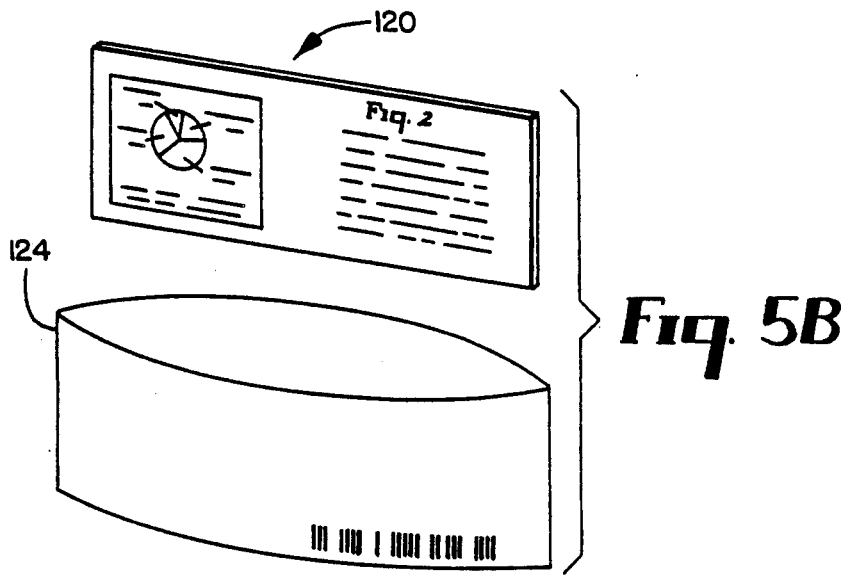
FIGS. 5A–5C are perspective views of alternative constructions of image access documents made in accordance with the present invention.
Figure 5A:
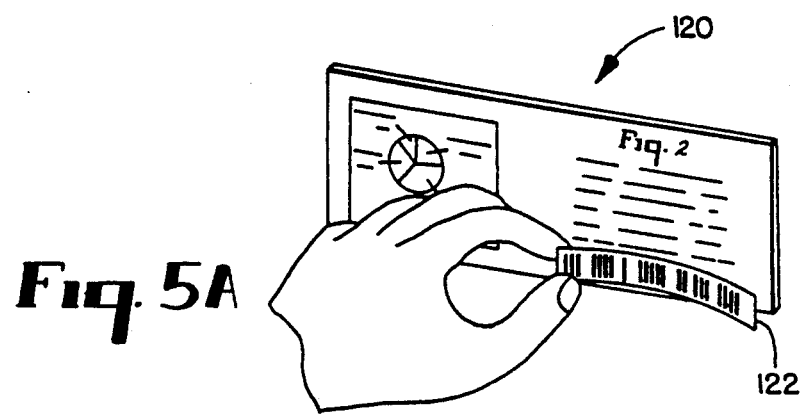
Figure 5C:
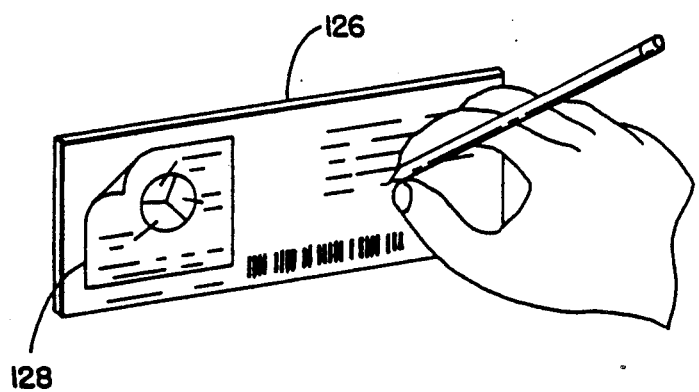

FIGS. 5A-5C depict alternate constructions of image access document 10 as contemplated by the foregoing description of card preparation software 40. FIG. 5A shows an image access document 120 on which is directly printed the human readable image and textual material. The machine readable reference number, however, is applied by means of an adhesive label 122. A similar use of a tag is shown in FIG. 5B. In that figure, the same document 120 is provided with a machine readable reference number by means of a transparent envelope 124. Use of envelope 124 is particularly advantageous since it also provides protection for document 120. Although an optical bar code is depicted on label 122 and envelope 124, the other means previously discussed could be used to place the reference number on such tags. Finally, FIG. 5C illustrates a more manual method of preparing an image access document. In this technique, notes are handwritten on a substrate 126 which is blank except for the preprinted reference number (in machine readable and human readable form). The image may be similarly sketched onto the image field, or affixed thereto, e.g., by means of a sticker 128. In this method, the user may enter the reference number of the images into card preparation system 40 after all of the documents have been prepared; alternatively, the cards may be fed into reader 56 to input the reference numbers. Printer 48 is not used in this method.

The foregoing description of card preparation system 40 and constructions for image access document 24 disclose several competing designs each having unique advantages and limitations. It will be appreciated, therefore, that features of the preferred embodiments will vary according to the targeted market. For example, users who already have a personal computer, peripherals (disk drive, display, standard printer) and graphics software may prefer to purchase only the card preparation software. This choice would have its corresponding limitations, such as the fragile nature of the resulting image access documents which are formed from the thin printer paper. As a further example, this same user could obtain a supply of protective, transparent envelopes having preprinted reference numbers. This would, of course, entail extra expense. Software may also be provided which would rebuild lost or destroyed image access documents from the images and reference table residing on the storage medium.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

I claim:

1. A method of preparing an image access document used to access an image recorded on a storage medium, comprising the steps, in any order, of:
   placing a human readable representation of the image on a supportive substrate;
   applying a machine readable reference number to said supportive substrate; and
   constructing an image reference table which correlates said reference number with an address of the image on the storage medium.

2. The method of claim 1 further comprising the step of recording the image on the storage medium.

3. The method of claim 1 wherein said human readable representation is placed on said substrate by mechanical printing means.

4. The method of claim 1 wherein said human readable representation is placed on said substrate by manual drawing.

5. The method of claim 1 wherein said human readable representation is placed on said substrate by sticker means.

6. The method of claim 1 wherein said substrate has first and second sides, said human readable representation being placed on said first side and said reference number being applied to said second side.

7. The method of claim 1 wherein said human readable representation and said reference number are accessible from the same side of said substrate.

8. The method of claim 1 wherein said reference number is optically encoded on said substrate.

9. The method of claim 1 wherein said reference number is electronically encoded on said substrate.

10. The method of claim 1 wherein said reference number is magnetically encoded on said substrate.

11. The method of claim 1 wherein said reference number is mechanically encoded on said substrate.

12. The method of claim 1 further comprising the step of storing said image reference table on the storage medium.

13. The method of claim 1 further comprising the step of putting textual material on said substrate.

14. The method of claim 1 wherein said reference number is indirectly applied to said substrate by first applying said reference number to tag means and then attaching said tag means to said substrate.

15. The method of claim 14 wherein said tag means comprises an envelope having at least one transparent surface, said reference number being applied to said envelope.

16. The method of claim 14 wherein said tag means comprises a label adhered to said substrate.

17. A method of preparing a storage medium and an image access document used to retrieve an image recorded on the storage medium, comprising the steps of:
   recording the image on the storage medium;
   printing a human readable representation of the image on a supportive substrate;
   applying a machine readable reference number to said supportive substrate;
   placing textual material on said supportive substrate;
   constructing an image reference table which correlates said reference number with an address of the image on the storage medium; and
   storing said image reference table on the storage medium.

18. The method of claim 17 wherein said reference number is applied to said supportive substrate by means selected from the group consisting of optical means, electronic means, magnetic means and mechanical means.

19. The method of claim 17 wherein said reference number is indirectly applied to said substrate by first applying said reference number to tag means and then attaching said tag means to said substrate.

20. A device for preparing an image access document used to access an image recorded on a storage medium, comprising:
   processor means for (i) placing the image in machine readable form on the storage medium, (ii) assigning a reference number to the image, and (iii) constructing an image reference table which correlates said reference number with an address of the image on the storage medium;
   keyboard means for controlling said processor means; and
   display means for interacting with said processor means.

21. The device of claim 20 wherein said processor means includes means for creating the image.

22. The device of claim 20 further comprising means for printing (i) a human readable representation of the image and (ii) said reference number, on a substrate, said printing means being connected to said processor means.

23. The device of claim 20 further comprising means for reading said reference number from a substrate having said reference number preprinted thereon in machine readable form, said reading means being connected to said processor means.

24. The device of claim 20 further comprising:
   means for printing a human readable representation of the image on a substrate; and
   means for reading said reference number from a carrier, said carrier having said reference number preprinted thereon in machine readable form, and said printing means and reading means being connected to said processor.

25. The device of claim 20 further comprising:
   means for printing a human readable representation of the image on a substrate; and
   output means for recording said reference number in machine readable form on said substrate, said printing and output means being connected to said processor means.

26. The device of claim 20 wherein said processor means further accepts textual material associated with the image and stores said textual material on the storage medium.

27. The device of claim 20 wherein said processor means further stores said reference table on the storage medium.

28. The device of claim 20 wherein said processor means further accepts animation codes associated with the image and stores said animation codes on the storage medium.

29. A card preparation system for preparing an image access document used to retrieve a stored image, comprising:
   a substrate;
   a medium for storing the image;
   processor means for (i) placing the image in machine readable form on said storage medium, (ii) assigning a reference number to the image, (iii) constructing an image reference table which correlates said reference number with an address of the image on said storage medium, and (iv) placing said reference table on said storage medium;
   a keyboard for controlling said processor means;
   a display for interacting with said processor means; and
   means for printing (i) a human readable representation of the image and (ii) a machine readable form of said reference number, on said substrate, said printing means being connected to said processor means.

30. The card preparation system of claim 29 wherein said processor means includes means for creating the image.

31. The card preparation system of claim 29 wherein said processor means further accepts (i) textual material associated with the image and (ii) animation codes associated with the image, and stores said textual material and said animation codes on said storage medium.

32. The card preparation system of claim 29 wherein said storage medium is selected from the group consisting of digital magnetic disks, analog magnetic disks, optical disks, video cassette tapes, and memory circuits.

* * * * *